(12) United States Patent  
Broderick et al.

(10) Patent No.: US 7,967,536 B2  
(45) Date of Patent: Jun. 28, 2011

(54) BLADE TRANSPORTATION

(75) Inventors: Daniel A Broderick, Fairless Hills, PA (US); Juan Moya Garcia, Fairless Hills, PA (US); Lou M Lofranco, Fairless Hills, PA (US)

(73) Assignee: Gamesa Innovation & Technology, S.L., Sarriguren (Navarra) (ES)

( * ) Notice: Subject to any disclaimer, the term of this patent is extended or adjusted under 35 U.S.C. 154(b) by 489 days.

(21) Appl. No.: 12/151,142

(22) Filed: May 2, 2008

(65) Prior Publication Data

US 2009/0274529 A1 Nov. 5, 2009

(51) Int. Cl.
*B60P 7/08* (2006.01)
(52) U.S. Cl. ............... 410/45; 410/44; 410/53; 410/120
(58) Field of Classification Search .................... 410/34, 410/35, 44, 45, 53.12; 280/404; 105/355
See application file for complete search history.

(56) References Cited

U.S. PATENT DOCUMENTS

| | | | | |
|---|---|---|---|---|
| 7,429,156 B2 * | 9/2008 | Jensen | ............................ | 410/45 |
| 2006/0144741 A1 * | 7/2006 | Wobben | | |
| 2009/0003957 A1 * | 1/2009 | Llorente Gonzalez | ......... | 410/35 |

* cited by examiner

*Primary Examiner* — Stephen Gordon
(74) *Attorney, Agent, or Firm* — Ladas & Parry LLP

(57) ABSTRACT

A transportation tooling of the type that borders the blade at its root and at an intermediate point. This tooling is used in combination with platforms placed on the transportation elements and the platforms can move transversely and turn or rotate with respect to the devices of transportation without affecting blade integrity. Also a method for blade transportation with the tip of one blade facing the tip of the adjacent blade so as to use the minimum space on the devices of transportation. The rail tooling takes into account the maximum corner radius that the train will encounter while absorbing the bending and torsion stress acting on the blades.

5 Claims, 4 Drawing Sheets

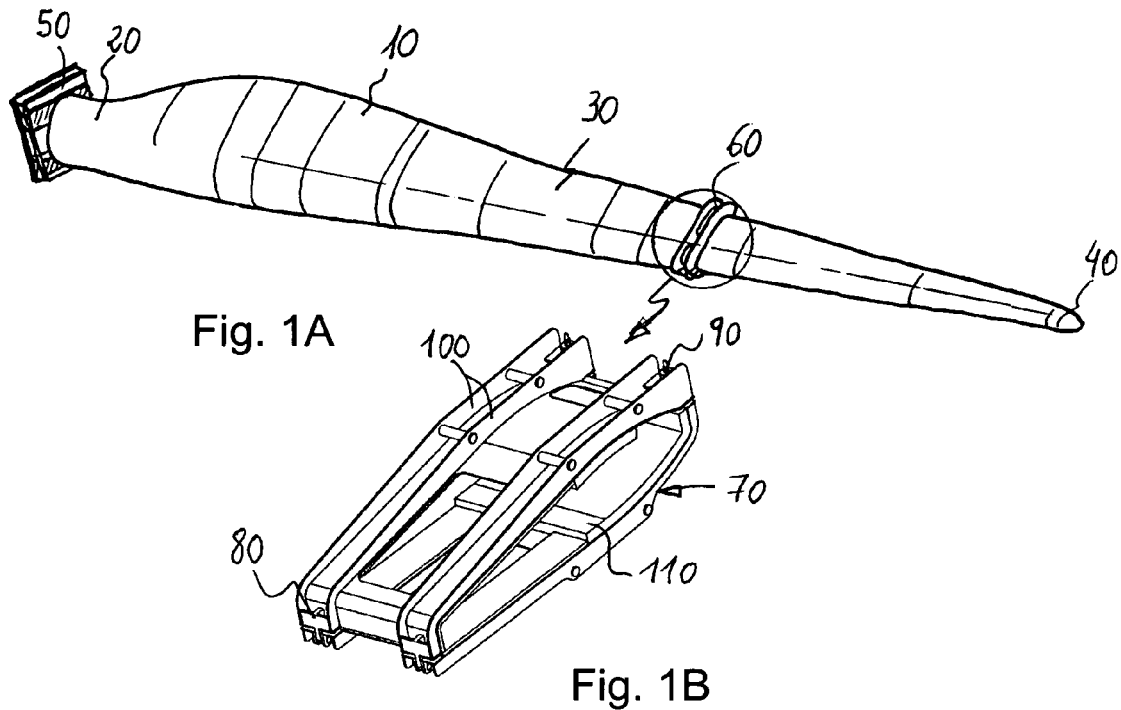
Fig. 1A
Fig. 1B
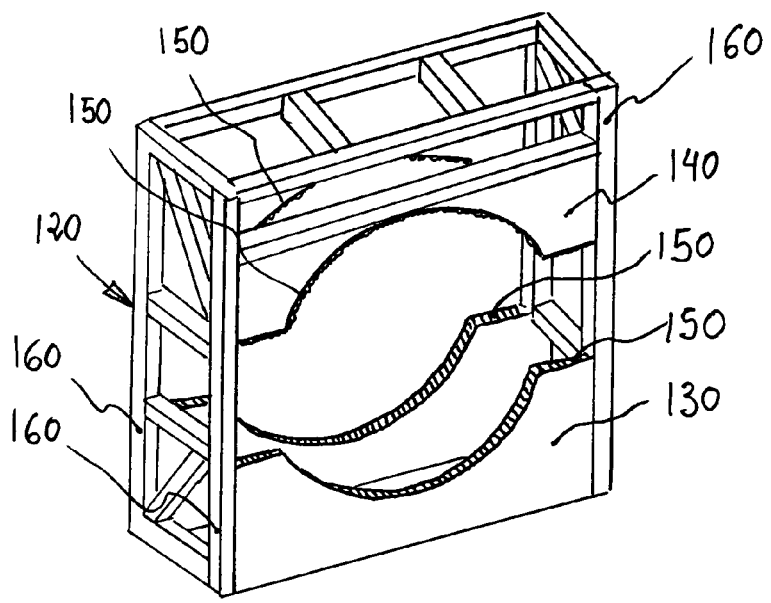
Fig. 2

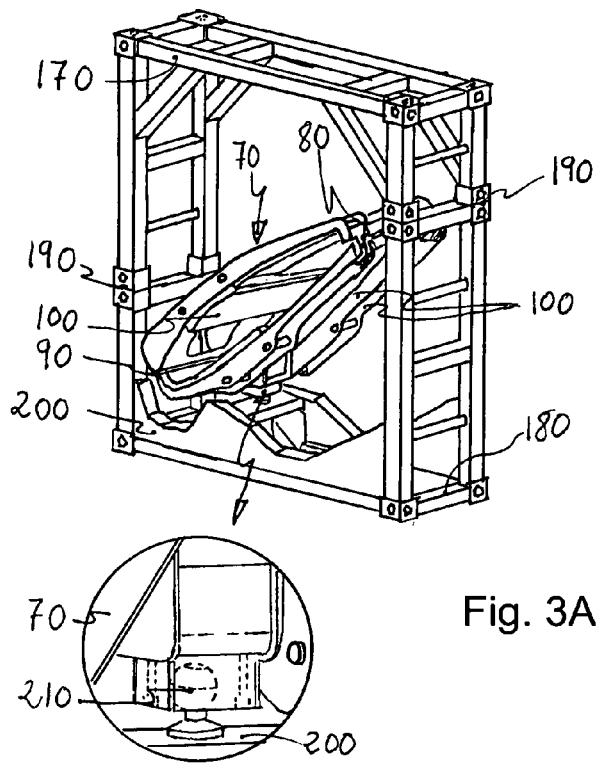
Fig. 3A
Fig. 3B
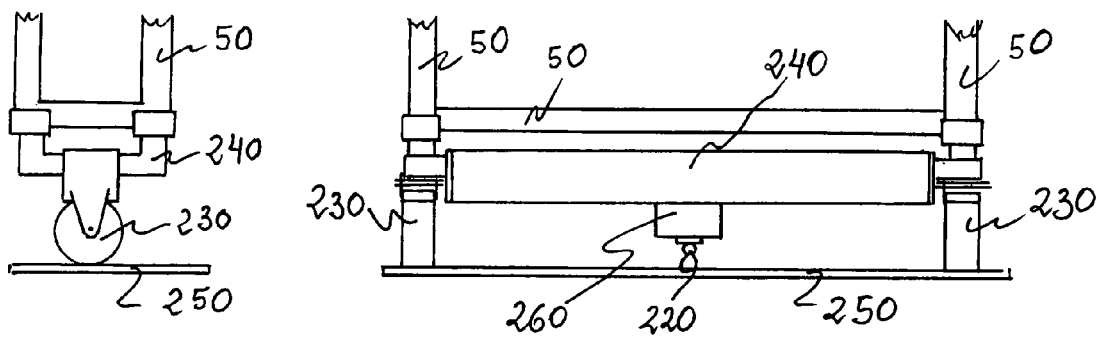
Fig. 4A
Fig. 4B

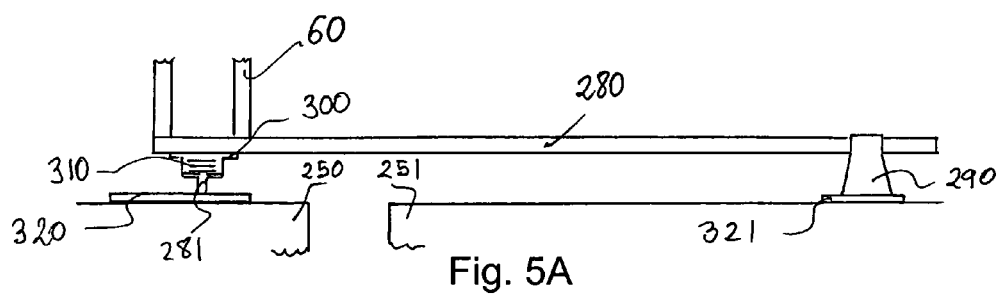
Fig. 5A
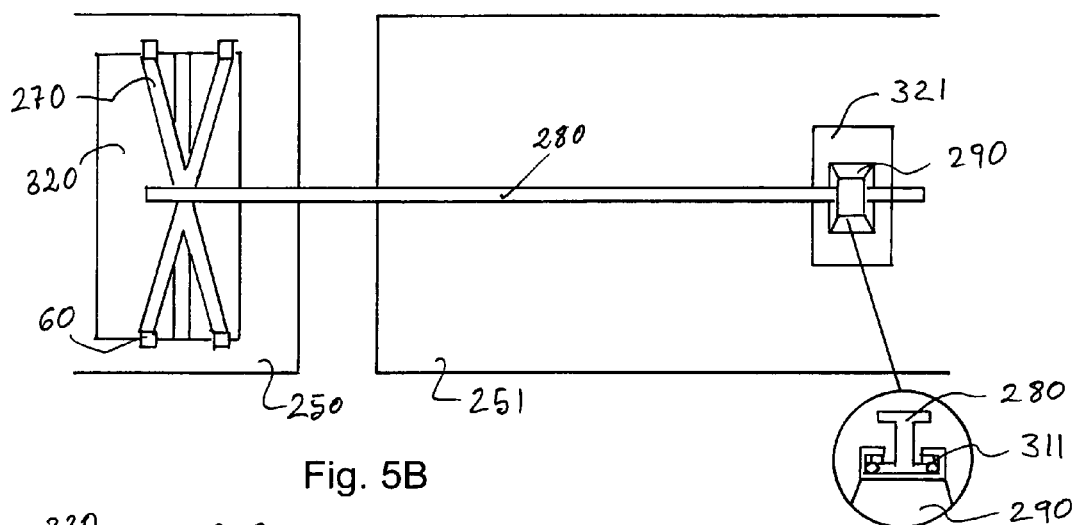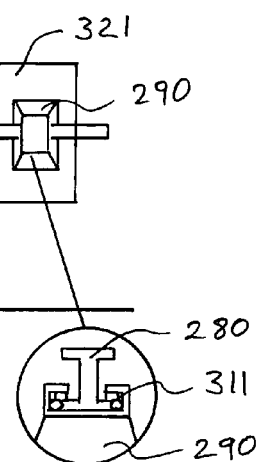
Fig. 5B
Fig. 5C
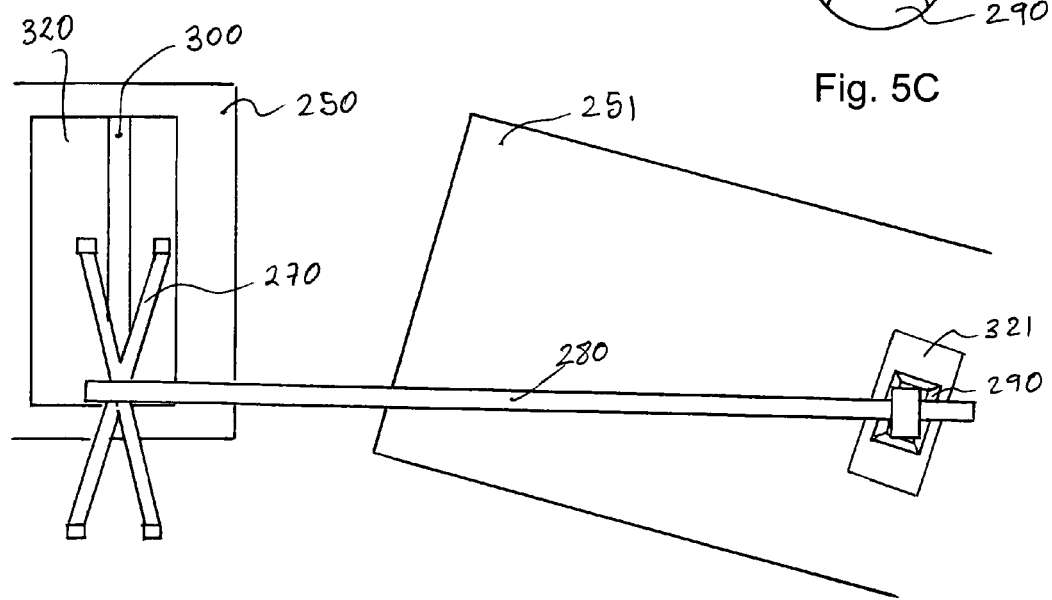
Fig. 5D

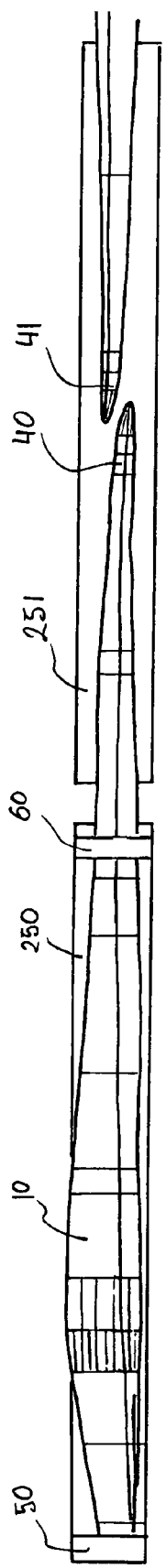
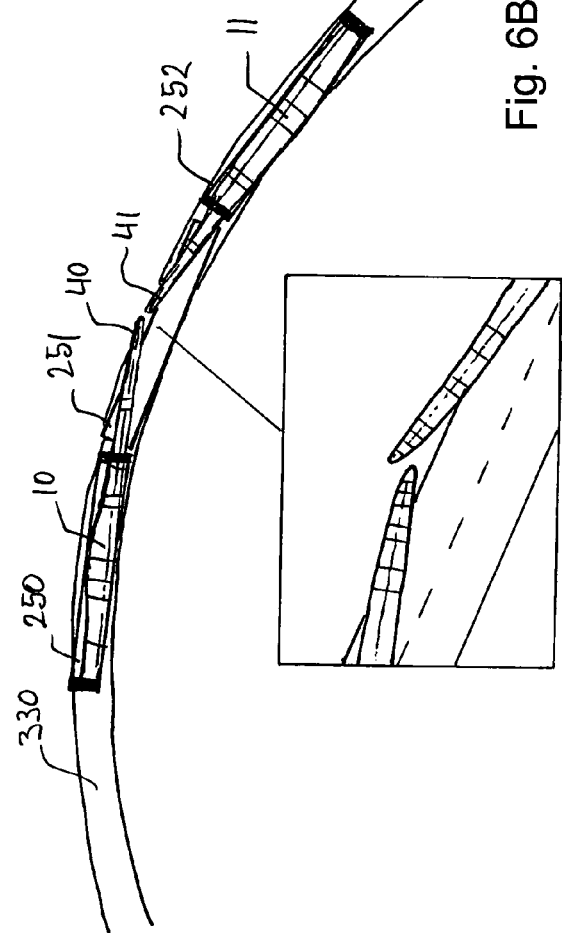
Fig. 6A
Fig. 6B
Fig. 6C

BLADE TRANSPORTATION

FIELD OF THE INVENTION

The present invention refers to the transportation of large-sized blades and more specifically to the transportation of these blades in the limited space available in train cargo rail cars. The blades are placed using two types of supports that are capable of movement in relation to the rail car platform, so that the blades are not structurally damaged while passing through the sharpest curves that may appear during the journey.

BACKGROUND OF THE INVENTION

Current development of wind turbines points to obtaining large quantities of power. This, in turn, results in an increase of the dimensions of all the elements. The larger size of the elements involves an increase in transportation costs and problems derived from safeguarding the integrity of the elements to be transported. Each mode of transportation has its own peculiarities. Land transportation is affected by complex terrain where the orography makes transportation difficult due to the bending and torsion stress affecting the blades. Patent P200700850 presented by Gamesa has been developed in order to minimize these transportation problems.

Other similar patents have been developed to overcome other problems. Thus, patent US2006144741 by Enercon presents a vehicle for blade transportation where the transportation device is the same size as the blade and where said device rotates during transportation. Patent WO2006000230 by Vandrup Specialtransp shows a non-traction platform adjacent to the tractor element provided with rotating transportation elements that can be adjusted according to the weight of the blade.

The blades are elements manufactured in composite material and are reaching lengths of between 40 and 65 meters due to the increase in the size of wind turbines. Since land transportation is one of the most common means of transportation, these blade lengths present serious transportation difficulties. A good alternative to conventional transportation is transportation by train.

The greatest difficulty presented by train transportation is the curve angle that can be reached in certain sections of the trajectory. The support tools of the present invention have been developed in order to solve the problems presented by this type of transportation.

DESCRIPTION OF THE INVENTION

One object of the invention is blade transportation in an articulated train, considering the maximum curvature that this means of transportation can endure.

Another object of the invention is the use of conventional rail cars, accommodating the maximum number of blades possible between the rail cars.

Another object of the invention is providing the rail cars with platforms on which supports are fastened, to be used in the transportation of the blades. There are two supports, one for the root and the other for the intermediate section of the blade.

Another object of the invention is that the platforms placed on the rail cars can move crosswise and turn and rotate with respect to the rail car, movements that safeguard the integrity of the blade. This and other fields of the invention are achieved by two supports, one located at the end of one rail car and the other located on the opposite end and extending to the adjacent rail car. These platforms are capable of absorbing the bending and torsion stresses that affect the blades and of moving the blades as needed to remain within the rail width limits.

In order to facilitate the explanation, a sheet of drawings is attached with an embodiment of a practical case of the scope of the present invention.

BRIEF DESCRIPTION OF THE FIGURES

FIG. 1A is a perspective view of a wind turbine blade with the root support tool and the auxiliary system of the intermediate support tool. FIG. 1B is an exploded view that shows the clamp that comprises the auxiliary system of the intermediate support tool.

FIG. 2 represents the support tool corresponding to the root area.

FIG. 3A is a perspective of the complete intermediate support tool and FIG. 3B is an exploded view of the union of the structure with the internal clamp.

FIGS. 4A and 4B are an elevation and cross section view of the support corresponding to the root support tool.

FIGS. 5A and 5B are an elevation and ground view of the intermediate support tool and its annex placed on the adjacent rail car. FIG. 5C is an exploded view that shows the beam end support. A ground view is also shown in FIG. 5D of the two supports and their movements while taking a curve.

FIGS. 6A, 6B and 6C show the location of a blade in one and a half rail cars, three rail cars taking a sharp curve and an exploded view of the behavior of the blade tips.

DESCRIPTION OF A PREFERRED EMBODIMENT

As represented in FIG. 1A, the blade of wind turbine 10 is an elongated body consisting of several sections: the root section 20 corresponds to the part that joins the blade and the hub, the intermediate section 30 and the tip of the blade 40. The blade is normally manufactured in composite material and its transportation and movement are delicate.

The blade 10 needs two points to fasten the elements required to hoist it. These points are the root section 20 and the intermediate section 30. Since the fastening elements can not be fastened on the bare blade, auxiliary elements are used, one root support tool 50 and one intermediate support tool 60.

The exploded view in FIG. 1B of the intermediate support tool 60 shows the auxiliary system. An elongated body clamp 70 whose profile coincides with the aerodynamic profile of the blade. It is provided with hinges 80 and hydraulic closures 90 on opposite sides so that it can be opened and closed for introduction or removal of the blade 10. It is also equipped on the outside with reinforcing elements 100 formed by two parallel beams. The inner part has a rubber surface 110 to prevent damage to the surface of the blade 10.

FIG. 2 shows the root support tool 50, consisting of a quadrangular frame 120 inside of which there is a lower bed 130 and an upper bed 140, both of semicircular shape. The areas of contact of the inner beds with the blade 10 have a rubber surface 150 and the lateral beams 160 that form the frame 120 can be completely separated on both sides for later connection and fastening with bolts or fastening elements.

As shown in FIGS. 3A and 3B, the intermediate support tool 60 is a frame formed by an upper frame 170 and a lower frame 180 that are coupled and uncoupled among themselves by means of the dividing points 190 on the sides of the frame. The lower frame 180 has an auxiliary element 200 at the base that includes a ball joint 210 through which the clamp 70 is coupled. As the ball joint 210 is the only point of support between the auxiliary element 200 and the clamp 70, the support of the intermediate support tool 60 for the blade 10 has three degrees of freedom of movement. The clamp 70 is placed with the side that corresponds to the hydraulic closures 90 next to the lower frame 180 and the side that corresponds to the hinges 80 is placed at the upper part of the intermediate support tool 60, next to the upper frame 170.

FIGS. 4A and 4B show the connecting link between the root support tool 50 and the rail car used as the means of transportation 250. The rail car in the present preferred embodiment is a convention rail car, open at the top part.

The root support tool 50 is supported by and fastened on a platform 240 with wheels 230 at both sides and a central ball joint 220 that connects by means of a support 260 the platform 240 and the rail car 250. This platform 240 is placed at one end of the rail car 250 and the combination of the wheels 230 and the ball joint 220, that is welded to the rail car 250, allows it to turn clockwise and counter-clockwise.

As shown in FIGS. 5A to 5D, the intermediate support tool 60 is placed on an X-shaped support 270 that is crossed by long beam 280 with a double T shape that extends from one rail car 250 to the adjacent rail car 251. The support 270 of the intermediate support tool, rests on a cross rail 300 inside of which there are rolling elements 310 in continuous contact with a short beam 281 with double T shape. The support 270 slides on the short beam 281 as the long beam 280 becomes out of alignment by the relative movement between one rail car 250 and the adjacent rail car 251. The long beam 280 is joined to the support 270 at one of its ends and rests on a beam end support 290 at the opposite end. In turn, the beam end support 290 rests on another set of rolling elements 311 that allows the long beam 280 to move longitudinally, while the beam end support 290 can rotate around itself.

The group formed by the support 270 of the intermediate support tool, the rail 300 and the short beam 281 is placed on a rectangular platform 320 with the same width as the length of the short beam 281 and to which the short beam 281 is welded. On the other hand, the beam end support 290 rests on another platform 321 that is also rectangular but smaller than the previously mentioned one. Both platforms 320 and 321 are fastened to their respective rail cars 250 and 251.

When the train takes a curve 330, the first rail car 250 and the adjacent rail car 251 are out of alignment. The support 270 of the intermediate support tool is pushed by the action of the long beam 280 and slides along the cross rail 300, while the platform 320 that holds the group remains fixed to the rail car 250. The opposite end of the long beam 280 causes the beam end support 290 to turn on the corresponding platform 321, at the same time it slides on its rolling elements 311, compensating the relative movements of both rail cars 250 and 251.

FIGS. 6A and 6B show two blades 10 and 11 in three rail cars 250, 251, 252 at the most critical moment that can come about during transportation: a curve 330 with the sharpest radius of curvature. Each blade is transported on one and a half rail car, with the tips of the blades facing each other. But due to the fact that the root support tool 50 turns, while the intermediate support tool 60 slides on the platform 320 that holds it, the tip of one blade 40 and the tip of the adjacent blade 41 do not collide, as can be seen in the exploded view of the FIG. 6C.

The invention claimed is:

1. Blade transportation, using various supports that border a blade at different points of the blade that allow for the blade to be handled from a place of manufacture to means of transportation where the blade is fastened, allowing for movement between some fastening supports and the means of transportation, said blade transportation comprising
   a root support tool 50 and an intermediate support tool 60, each support tool having a quadrangular frame and comprising inner auxiliary elements, a distance between the support tools being equal to a length of a carrier vehicle, wherein:
   the root support tool 50 is supported and fastened on a platform 240 with wheels 230 at two sides and a central ball joint 220 that connects the platform 240 and the carrier vehicle,
   the intermediate support tool 60 is placed on an X-shaped support 270 crossed by a long beam 280 with a double T shape that extends from one vehicle to an adjacent vehicle,
   the support 270 of the intermediate support tool 270 rests on a cross rail 300 inside of which there are rolling elements 310 in continuous contact with a short beam 281 with a double T shape, which is seated on a platform 320, and
   the long beam 280 is joined to the support 270 at one end and rests on a beam end support 290 at an other end.

2. Blade transportation according to claim 1, wherein the root support tool 50 is formed by a frame 120 inside of which there is a lower bed 130 and an upper bed 140, both beds being of semicircular shape and having some contact areas with the blade 10 with a rubber surface 150, and some lateral flanges 160 that comprise the frame 120 can be completely separated at sides thereof on both sides for later connection and fastening with bolts or fastening elements.

3. Blade transportation according to claim 1, wherein the intermediate support tool 60 is a frame consisting of an upper frame 170 and a lower frame 180 that can be coupled and uncoupled from each other, the lower frame 180 having at a base an auxiliary element 200 that includes a ball joint 210 through which is coupled a clamp 70 which comprises hinges 80 and hydraulic closures 90 at opposite ends, the clamp comprising elements 100 on an outside, and a surface 110 on an inside.

4. Blade transportation according to claim 1, wherein the intermediate support tool 60 is coupled on the platform 320 over which the intermediate support tool 60 slides transversely to the blade by means of the long beam 280 and the root support tool 60 turns on the lateral wheels 230 pivoting on the ball joint 220 that fastens the carrier vehicle 250 and the platform 240 that supports the intermediate support tool, wherein movements are produced when the carrier vehicle and an adjacent vehicle are out of alignment.

5. Blade transportation according to claim 1, wherein the carrier vehicle is a rail car 250 of a train of standard dimensions and two blades 10, 11 are transported between three rail cars 250, 251, 252.

* * * * *